United States Patent
Johns

(10) Patent No.: US 8,081,748 B2
(45) Date of Patent: Dec. 20, 2011

(54) CALL ANSWERING

(75) Inventor: Kevin C. Johns, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1402 days.

(21) Appl. No.: 11/558,155

(22) Filed: Nov. 9, 2006

(65) Prior Publication Data

US 2008/0112555 A1    May 15, 2008

(51) Int. Cl.
*H04M 3/42* (2006.01)
(52) U.S. Cl. ............ 379/211.01; 370/352; 379/88.12; 379/201.01; 379/207.02; 379/207.16; 379/208.01; 455/414.1; 455/550.1
(58) Field of Classification Search .......... 370/259–271, 370/351–356; 379/67.1–88.28, 201.01, 207.02–215.01; 455/412.1–417, 422.1–426.2, 445, 461, 550.1–560; 704/270–278; 709/201–207, 217–232
See application file for complete search history.

(56) References Cited

U.S. PATENT DOCUMENTS

| | | | | |
|---|---|---|---|---|
| 5,329,578 A * | 7/1994 | Brennan et al. | .......... | 379/211.03 |
| 5,657,372 A * | 8/1997 | Ahlberg et al. | ............ | 455/414.1 |
| 6,018,671 A * | 1/2000 | Bremer | ........................ | 455/567 |
| 6,363,258 B1 * | 3/2002 | Schmidt et al. | ............... | 455/514 |
| 6,704,395 B1 * | 3/2004 | Borland et al. | ............... | 379/67.1 |
| 6,816,577 B2 * | 11/2004 | Logan | ........................ | 379/67.1 |
| 7,286,649 B1 * | 10/2007 | Nelson et al. | ................... | 379/71 |
| 7,305,068 B2 * | 12/2007 | Tucker et al. | ............... | 379/88.11 |
| 7,672,440 B2 * | 3/2010 | Chen et al. | ............... | 379/209.01 |
| 2002/0001368 A1 * | 1/2002 | Smith et al. | ..................... | 379/52 |
| 2003/0231748 A1 * | 12/2003 | Novelline | .................. | 379/88.23 |
| 2004/0189484 A1 * | 9/2004 | Li | ........................... | 340/825.19 |
| 2004/0198427 A1 * | 10/2004 | Kimbell et al. | ................ | 455/556.1 |
| 2004/0233892 A1 * | 11/2004 | Roberts et al. | ............... | 370/352 |
| 2005/0107130 A1 * | 5/2005 | Peterson, II | ................... | 455/567 |
| 2005/0136976 A1 * | 6/2005 | Shoemake | .................. | 455/557 |
| 2006/0046701 A1 * | 3/2006 | Anderson et al. | .......... | 455/414.4 |
| 2006/0172709 A1 | 8/2006 | Eyer et al. | | |
| 2008/0014899 A1 * | 1/2008 | Day | ........................... | 455/404.1 |
| 2008/0102783 A1 * | 5/2008 | Bustamante | ............... | 455/404.1 |

* cited by examiner

*Primary Examiner* — Hemant Patel
(74) *Attorney, Agent, or Firm* — Brooks Kushman P.C.

(57) ABSTRACT

A method, phone, and system for answering phone calls in such a manner as to limit or otherwise ameliorate interruptions to a called party and others in an environment of the called party. The answering optionally including silently answering the phone call with a message instead of requiring the called party to verbally communicate with a calling party.

9 Claims, 1 Drawing Sheet

CALL ANSWERING

BACKGROUND OF THE INVENTION

1. Field of the Invention

The present invention relates to answering phone calls in a manner so as to limit interruptions to a called party.

2. Background Art

A mobile phone user is often confronted with answering phone calls at inopportune times, such as but not limited to when in meetings or other social environments where the user and others around the user may be interrupted if the called party were to verbally answering the phone.

One solution to this problem relates to the called party simply letting the phone ring while they rush off to a quiet environment suitable for answering the call. This, however, is problematic as it requires the user to be alerted to the incoming call and to leave their current environment in order to answer it before the call is sent to voicemail. A variant on this problem further includes the called party simply answering the call and stepping out of the room but this is similarly problematic in that it requires the user to be alerted of the incoming call and/or to verbally communicate to the calling party that they are in the process of stepping out of the room, which may similarly cause interruptions.

As such, a need exist to facilitating answering phone calls in such a manner as to limit interruptions.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
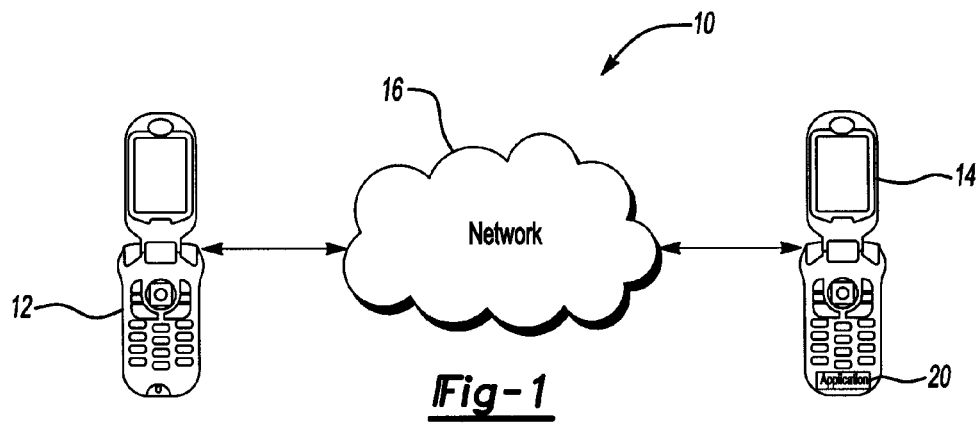
FIG. 1 illustrates a system for answering phone calls in accordance with one non-limiting aspect of the present invention.

FIG. 1 illustrates a system 10 for answering phone calls in accordance with one non-limiting aspect of the present invention. The system 10 relates to any environment where a calling party associated with a first phone 12 desires to make a phone call to a called party associated with a second phone 14. Signals associated with the phone call may be carried over a phone network 16 so as to facilitate communications between the parties.

The phones 12-14 may be cellular, satellite, point-to-point (i.e. walkie-talkie), internet protocol (IP), wireline, cable, data, or any other type of phone having capabilities suitable to facilitate verbal and non-verbal communications (text, data, etc.). The network 16 may be a wireless, wireline, satellite, or any other type of network having capabilities suitable to facilitating communications between the phones.

The present invention is predominately described with respect to a mobile phone setting where the phone 14 of the called party includes mobile capabilities associated with supporting mobile phone calls and the communication of the phone signals over a mobile phone network 16. The present invention, however, is not intended to be so limited and fully contemplates its application in any number of environments and just the environments described herein.

One or more of the phones 12-14 may include a call answering application/controller 20 designed to operate in accordance with the present invention. The call answering application 20 may be downloaded to or otherwise configured for operation with one of the phones, which for exemplary purposes is described with respect to the phone 14 of the called party. The application 20 may included any number of features and capabilities associated with facilitating phone answering in accordance with the present invention. The application 20 may be associated with any format and/or feature suitable for use with the phone 14 and controlling or otherwise instructing operation of the phone 14 in accordance with the present invention.

The call answering application 20 may be configured to facilitate answering phone calls in a manner that limits interruptions to the called party and others in the environment associated with the called party. One non-limiting aspect of the application may relate to allowing the called party to place an incoming call on hold, which may be helpful in allowing the called party to delay answering the phone 14 such as to permit the called party to leave a meeting room and/or otherwise take the call in another location. Another non-limiting aspect of the application may relate to allowing the calling party to leave a message instead of waiting on hold for the called party. These and other aspects of the present invention are described below in more detail.

Figure 2:
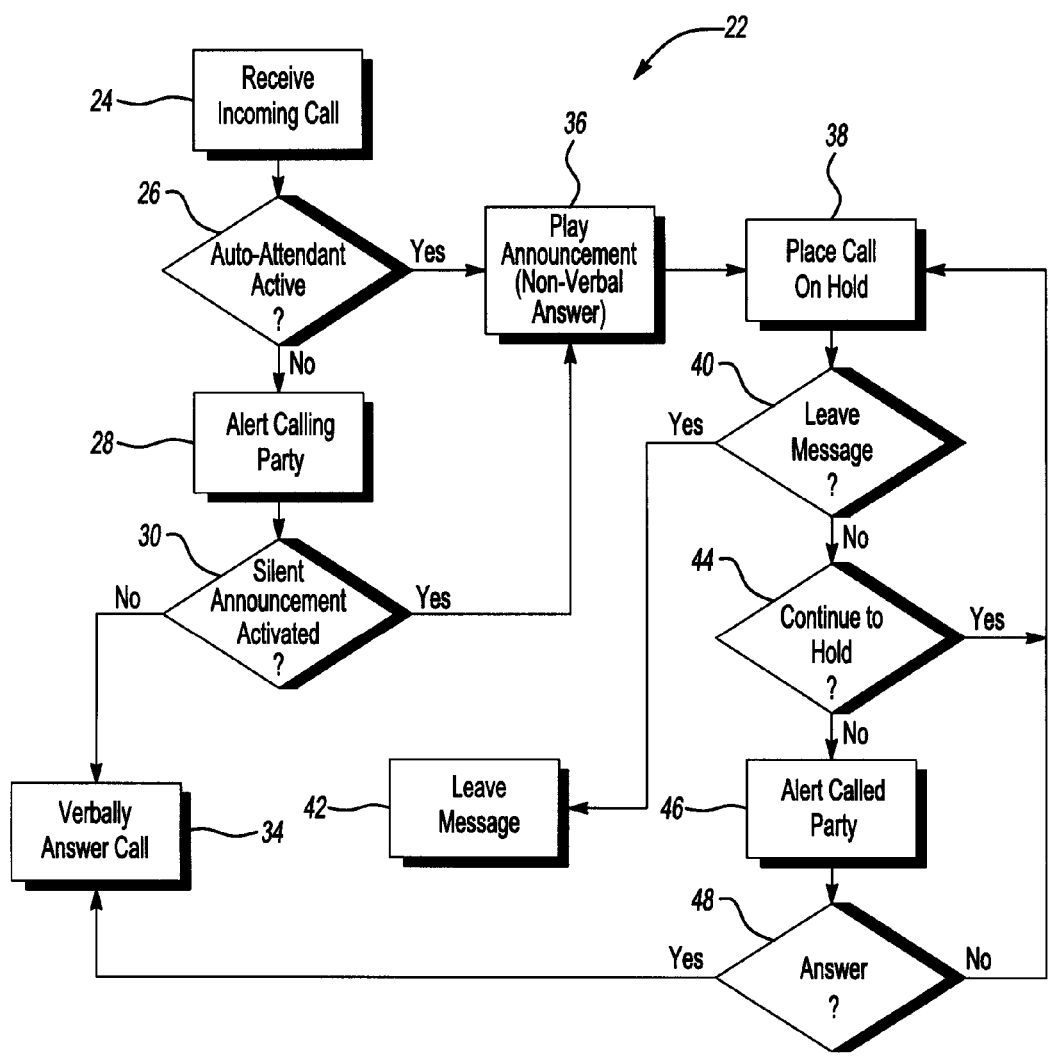
FIG. 2 illustrates a flowchart of a method of call answering in accordance with one non-limiting aspect of the present invention.

FIG. 2 illustrates a flowchart 22 of a method of call answering in accordance with one non-limiting aspect of the present invention. The method may be executed or otherwise facilitated with the application described and/or through some other means suitable for use with the present invention. The method generally relates to facilitating call answering in such a manner as to limit or otherwise ameliorate interruptions to the called party and others in the environment of the called party.

Block 24 relates to receiving an incoming the call. The receipt of the incoming call may be determined by the phone of the called party in a manner commonly understood by one having ordinary skill in the art. Optionally, this determination occurs before the called party actually answers the call, i.e., before an answer button or other user action establishes verbal communications with the calling party and/or before an alert associated with the phone is generated (audible, non-audible, etc.).

With respect to some phones, for example, receiving the incoming phone call may include establishing communications with the calling party but doing so without actually allowing the calling party to hear the called party and without notifying the called party of the incoming call. Some phone calls may be placed into a voicemail box located on the phone network if the called phone fails to answer the call within a predefined period of time. As described below in more detail, the present invention may desire to keep the calling party on hold or take other action before the called party is required to answer the phone. This period may extend beyond the answering time period specified for forwarding the call to voicemail such that the called phone may be required to connect the call in order to prevent the call from being forwarded to voicemail in such a manner as to permit the operations of the present invention.

Block 26 relates to determining whether an auto-attendant feature is enabled. The auto-attendant feature may relate to a feature enabled on the phone to facilitate silently answering phone calls, i.e., before the called party is alerted to the incoming call. The auto-attendant feature may be instigated through a user interface of the phone or through some other communication therewith. The auto-attendant feature generally corresponds with the user interfacing with a phone setting that limits interruptions in accordance with the present invention and doing so at some point prior to actually receiving the call.

Block 28 is reached if the called party has failed to instigate the auto-attendant feature. This may occur if the user forgets to change the phone setting or otherwise desires to be alerted to the incoming phone call. Block 28 generally relates to alerting the called party of the incoming call through a phone generated alert, such as but not limited to a ring (audible) or vibration (non-audible) alert. Optionally, proximate to alerting the called party, a feature may be provided though the user interface to activate a silent announcement.

Block 30 relates to determining a response of the called party to the silent announcement option. The silent announcement generally relates to an option whereby the user may play a silent announcement message in place of personally answering the phone call with their own verbal communication. If the called party does not desire the silent announcement, the called party may simply select the corresponding option on the phone.

Block 34 relates to the called party electing against the non-verbal answering in favor of a verbal answer. The verbal answer generally corresponds with the called party pressing an answer button or taking other action with respect to the phone in order to immediately establish verbal communications with the calling party. Once the verbal communications are established, the called party simply greets the calling party and begins the phone conversation according to normal answering procedures. The ability to normally answer the phone can be helpful in allowing the user the option to answer the call without further delay.

Block 36 relates to the called party electing to instigate the silent answering capabilities of the present invention. The silent answering generally corresponds with playing an announcement message to the calling party in place of actually requiring the called party to issue a verbal greeting. Optionally, this announcement may be played without activating a microphone or other feature of the phone so that the user hears the announcement without background noise and without overhearing other conversation that may be taking place in the environment around the called party.

Block 36 may also be reached if the auto-attendant feature of Block 26 is active. As noted above, the auto-attendant feature relates to automatically instigating the silent answering capabilities of the present invention prior to alerting the called party of the incoming call. This can be helpful in allowing the called party to automatically set their phone to forward the calls to the silent announcement instead of having to take user action, as is the case with respect to requiring user input in Block 30 in order to instigate the silent announcement.

The announcement played with the silent answering feature may include a message and/or instructions for instructing the calling entity with respect to establishing verbal communications with the user. The message may be stored on the phone and relate to a previous verbal recording of the called party expressing an inability to immediately answer the phone but that they will be with the called party in one moment. This may be helpful to allow the called party to leave the room or otherwise proceed to a location more suitable to answering the call.

The announcement may optionally include a hold time for announcing when the called party believes they will be able to take the call. For example, the auto-attendant feature may be pre-programmed with a hold period by the called party based on an anticipate time for the called party to retire to a more suitable location for answering the phone and/or the hold period may be specified in Block 30 when the option instigate the silent announcement is selected by the user, i.e., the user may input a time period at the same time as enabling the silent answer.

The message played in the announcement may similarly be selected based on prior inputs of the called party and/or at the time of selecting the option to instigate the silent answering. For example, the option to instigate the silent answering may further include options for specifying the message played to the called party, such as a message indicating when the called party expects to be available again, an out of office message, etc.

Once the call is on hold in Block 38, i.e., once the silent answering is engaged, the called party may answer the call at anytime thereafter by simply pressing a button on the phone and/or taking some other action with respect to the same. Optionally, after the hold period elapses the calling party may be disconnected and/or sent to voicemail.

Block 40 relates to another feature that may be included in the announcement message whereby an option is provided to the calling party for leaving a message in place of waiting. The announcement message may specify calling party options, such as pressing "1" to wait on hold and/or to hear other options (depending on the configuration of the message) and pressing "2" to leave a message (verbal or non-verbal) with the called party instead of continuing to wait on hold. If the calling party elects to leave a message, Block 42 is reached and the calling party is transferred to voicemail and/or otherwise enabled to leave a message. If the calling party elects to wait on hold and/or to hear other options, Block 44 is reached.

Block 44 relates to verifying whether the calling party would rather wait on hold and/or take other action, such as but not limited to alerting the called party to the incoming call. Another announcement message may be played offering the calling party similar options with respect to press "1" to continue to wait on hold and pressing "2" to alert the called party to the call. Block 38 is reached if "1" is selected and Block 46 is reached if "2" is selected.

Block 46 relates to generating an alert to the called party with respect to the incoming call. This may be helpful in emergency situations and/or other conditions under which the calling party may desire to speak with the called party. The alert may be a pre-selected alert and/or the option in Bock 46 to alert the called party may further include options for the calling party to specify parameters for the alert, such as but not limited to specifying a ring (audible and/or inaudible), severity of the alert (urgent, emergency, etc.), duration, call back number, etc.

Optionally, the alert may include a message from the calling party. For example, the called party in Block 30 may specify a textual message to the calling party inquiring as to the nature of the call. The called party may then enter response with a corresponding text message being added to the alert selected in Block 46. In this manner, the parties may correspond with each other prior to establishing verbal communications.

Block 34 is returned to if the called party elects to answer the call and Block 38 is reached if the called party elects not to answer or fails to answer the call. Block 38 may be similarly reached if the calling party in Block 44 elects to continue to hold. The call may then be place on hold again for the hold period and/or the announcement message after an optional delay may be played again so as to provide the calling party with another opportunity to leave a message and/or to alert the called party.

The method described above therefore allows the called party the option to answer incoming calls and/or to silently or non-intrusively place incoming calls on hold. The holding may optional include a hold period and calling party options with respect to remaining on hold, leaving a message, or alerting the called party to the incoming call. These and other features may be included in accordance with the present invention to facilitate answering in such a manner as to limit or otherwise ameliorate interruptions to the called party and others in the environment of the called party.

One non-limiting aspect of the present invention outlines a process for allowing cell phone users to automatically answer a call, play a pre-recorded message and then locally hold the call for a short period of time. This may include a method for cell phone users to automatically answer a call, play a pre-recorded message and then place the call on hold.

One application for such a feature is for business professionals who receive a phone call during a meeting or in a crowded environment. This limits problems associated with the called party rushing to a quiet location while the calling party wonders why the ringing stopped but no one is there, or to silence the phone and try to rush to a quiet location to answer the call before it goes to voicemail.

One non-limiting aspect of the present invention allows the user to direct the phone to automatically answer the call and play a short prerecorded message such as 'please wait while I find a quiet location to accept your call' or to allow the user to answer the call as usual. For the case where the user tells the phone to auto-answer the call and play a message, once a quiet location has been found, the user answers the call. Such a method may require the ability to record, store and play back the recorded message on the cell phone itself.

One non-limiting aspect of the present invention may include an auto-attendant feature that is locally controlled at the phone. In such a case, the user can configure a basic interactive voice response system to direct the inbound call to either the phone or voice mail. Such an application could be used for cases where the user wishes to only be disturbed for important calls. An auto-attendant could be configured such that a brief message is played for indicating the user wishes to not be disturbed, if the call is of an urgent matter the originator could press "1" and be directed to the user's phone or press "2" and be directed to voice mail. This basic functionality essentially screens the inbound call before presenting to the user.

One non-limiting aspect of the present invention thus ameliorates to situations in which many people rush out of rooms to answer cell phone calls and may be based on the answering feature optionally being locally controlled, as opposed to being controlled through the phone network. By allowing the feature to be locally controlled, more flexibility and control is given to the end user to use the feature when they want and customize it to meet their needs, as opposed to network controlled features that tend to be either always on or always off and they do not tend to support more dynamic models such as enabling/disabling as the user enters/leaves a meeting.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An application for use with a phone to facilitate answering a phone call, the application including instructions for:
    connecting the phone call to a phone in such a manner that the phone answers the phone call and simultaneously places the phone call on hold, the hold preventing a calling entity from verbally communication with a called entity;
    playing an announcement message to the calling entity, the announcement message notifying the calling entity that the phone call is on hold and that the calling entity can select at least one of a first option to remain on hold and a second option to notify the called entity of an emergency;
    generating a hold alert to notify the called entity of the phone call being on hold in response to the calling entity selecting the first option;
    generating an emergency alert to notify the called entity of the emergency in response to the calling entity selecting the second option; and
    removing the phone call from hold to allow the calling entity to verbally communicate with the called entity upon receipt a corresponding input from the called entity after being notified with one of the hold alert and the emergency alert wherein parameters of the hold alert are fixed and parameters of the emergency alert are specified by the calling entity.

2. The application of claim 1 wherein in the announcement message is played from a storage location on the phone.

3. The application of claim 1 wherein the emergency alert is different from the hold alert.

4. The application of claim 1 wherein the hold alert generates a first type of ringtone and the emergency alert generates a second type of ringtone.

5. The application of claim 1 wherein the hold and emergency alerts cause the phone to vibrate, the emergency alert causing the phone to vibrate with more severity than the hold alert.

6. The application of claim 1 wherein the hold and emergency alerts cause the phone to vibrate, the emergency alert causing the phone to vibrate with a different pattern than the hold alert.

7. The application of claim 1 wherein the first option allows the calling party to remain on hold without having to communicate a corresponding input to the phone.

8. A method to facilitate answering a phone call comprising:
    connecting the phone call to a phone in such a manner that the phone answers the phone call and simultaneously places the phone call on hold, the hold preventing a calling entity from verbally communication with a called entity;
    playing an announcement message to the calling entity, the announcement message notifying the calling entity that the phone call is on hold and that the calling entity can select at least one of a first option to remain on hold and a second option to notify the called entity of an emergency;

generating a hold alert to notify the called entity of the phone call being on hold in response to the calling entity selecting the first option;

generating an emergency alert to notify the called entity of the emergency in response to the calling entity selecting the second option;

removing the phone call from hold to allow the calling entity to verbally communicate with the called entity upon receipt a corresponding input from the called entity after being notified with one of the hold alert and the emergency alert; and wherein parameters of the hold alert are fixed and parameters of the emergency alert are specified by the calling entity.

9. A phone configured for:

connecting a phone call in such a manner that the phone answers the phone call and simultaneously places the phone call on hold, the hold preventing a calling entity from verbally communication with a called entity;

playing an announcement message to the calling entity, the announcement message notifying the calling entity that the phone call is on hold and that the calling entity can select at least one of a first option to remain on hold and a second option to notify the called entity of an emergency;

generating a hold alert to notify the called entity of the phone call being on hold in response to the calling entity selecting the first option;

generating an emergency alert to notify the called entity of the emergency in response to the calling entity selecting the second option;

removing the phone call from hold to allow the calling entity to verbally communicate with the called entity upon receipt a corresponding input from the called entity after being notified with one of the hold alert and the emergency alert; and wherein parameters of the hold alert are fixed and parameters of the emergency alert are specified by the calling entity.

* * * * *